US006943210B2

(12) United States Patent
Röckrath et al.

(10) Patent No.: US 6,943,210 B2
(45) Date of Patent: Sep. 13, 2005

(54) PSEUDOPLASTIC POWDERED LACQUER SLURRY FREE OF ORGANIC SOLVENTS METHOD FOR PRODUCTION AND THE USE THEREOF

(75) Inventors: Ulrike Röckrath, Senden (DE); Günther Ott, Münster (DE); Jan Berg, Münster (DE); Werner-Alfons Jung, Ascheberg (DE); Joachim Woltering, Münster (DE)

(73) Assignee: BASF Coatings AG, Munster (DE)

( * ) Notice: Subject to any disclaimer, the term of this patent is extended or adjusted under 35 U.S.C. 154(b) by 375 days.

(21) Appl. No.: 10/169,699

(22) PCT Filed: Jan. 11, 2001

(86) PCT No.: PCT/EP01/00260

§ 371 (c)(1),
(2), (4) Date: Jun. 20, 2002

(87) PCT Pub. No.: WO01/51569

PCT Pub. Date: Jul. 19, 2001

(65) Prior Publication Data

US 2003/0022985 A1 Jan. 30, 2003

(30) Foreign Application Priority Data

Jan. 15, 2000  (DE) ......................................... 100 01 442

(51) Int. Cl.[7] ............................. C08J 3/00; C08K 3/20; C08L 75/00; C08F 8/30; C08F 20/00
(52) U.S. Cl. ................. 524/507; 427/372.2; 427/385.5; 524/500; 524/591; 524/839; 524/840; 524/539; 525/123; 525/124; 525/127; 525/440; 525/455
(58) Field of Search ................. 524/507, 500, 524/591, 839, 840, 539; 525/123, 124, 127, 440, 455; 427/372.2, 385.5

(56) References Cited

U.S. PATENT DOCUMENTS

| 4,071,428 A | 1/1978 | Bosso et al. ............. 204/181 C |
| 4,268,542 A | 5/1981 | Sakakibara et al. ......... 427/195 |
| 4,332,711 A | 6/1982 | Kooymanns et al. ....... 523/402 |
| 4,400,497 A | 8/1983 | Blum et al. |
| 4,482,721 A | 11/1984 | Wegner et al. .............. 548/262 |
| 4,483,974 A | 11/1984 | Grögler et al. |
| 4,507,456 A | 3/1985 | Blum et al. |
| 4,578,426 A | 3/1986 | Lenz et al. .................. 525/131 |
| 4,888,124 A | 12/1989 | Blum et al. |
| 4,939,213 A | 7/1990 | Jacobs, III et al. ...... 525/329.9 |
| 5,084,541 A | 1/1992 | Jacobs, III et al. ........... 528/45 |
| 5,185,422 A | 2/1993 | Drouvé et al. |
| 5,288,865 A | 2/1994 | Gupta ........................ 544/200 |
| 5,379,947 A | 1/1995 | Williams et al. .............. 241/21 |
| 5,475,073 A | 12/1995 | Guo ............................ 526/333 |
| 5,480,493 A | 1/1996 | Harry, Jr. ....................... 134/4 |
| 5,510,444 A | 4/1996 | Halpaap et al. |
| 5,534,598 A | 7/1996 | Guo ......................... 525/329.2 |
| 5,719,246 A | 2/1998 | Taniguchi et al. .......... 526/320 |
| 5,817,733 A | 10/1998 | Rink ............................. 528/71 |
| 5,852,120 A | 12/1998 | Bederke et al. ............. 525/124 |
| 5,889,106 A | 3/1999 | Kurek et al. ................. 524/589 |
| 5,965,213 A | * 10/1999 | Sacharski et al. ............ 427/475 |
| 5,981,653 A | 11/1999 | Wilmes et al. .............. 524/839 |
| 6,093,497 A | 7/2000 | Wiemann et al. ............ 428/500 |
| 6,129,989 A | 10/2000 | Sapper ........................ 428/500 |
| 6,156,117 A | 12/2000 | Freemann et al. .......... 106/487 |
| 6,177,487 B1 | 1/2001 | Sapper et al. ................ 523/333 |
| 6,187,384 B1 | 2/2001 | Wilke et al. .............. 427/388.4 |
| 6,268,021 B1 | 7/2001 | Flosbach et al. .......... 427/407.1 |
| 6,372,875 B1 | 4/2002 | Mayer et al. .................. 528/60 |
| 6,624,239 B1 | 9/2003 | Bendix et al. |
| 2003/0144413 A1 | 7/2003 | Ott et al. |

FOREIGN PATENT DOCUMENTS

| CA | 2112415 | 12/1993 | ......... C09D/175/04 |
| CA | 2112862 | 1/1994 | ............ C09D/5/44 |
| CA | 2216111 | 4/1996 | ............ C09D/5/03 |
| CA | 2224864 | 6/1996 | ......... C09D/163/00 |
| CA | 2255611 | 12/1997 | |
| DE | 19652842 | 6/1997 | ............ B05D/7/26 |
| DE | 19908013 | 2/1999 | ............ C09D/5/03 |
| EP | 012 463 | 11/1979 | ............ C09D/5/40 |
| EP | 038 127 | 3/1981 | ............ B05D/7/26 |
| EP | 548 690 | 12/1992 | ............ B05D/3/00 |
| EP | 612 818 | 2/1994 | ............ C09D/5/44 |
| EP | 767 185 | 6/1995 | ........... C08F/21/06 |
| GB | 1 530 021 | 2/1976 | ............. C08J/3/10 |
| GB | 1 530 022 | 2/1976 | ............. C08J/3/10 |
| WO | WO98/29465 | 7/1998 | ......... C08F/283/00 |
| WO | WO00/15721 | 3/2000 | ............ C09D/5/02 |
| WO | WO00/50518 | 8/2000 | ............ C09D/5/02 |
| WO | WO00/69979 | 11/2000 | ............ C09D/5/00 |

OTHER PUBLICATIONS

English Abstract for EP 0 652 264.
English Abstract for WO00/15721 on the front page of the International Publication.
English Abstract for DE19908013.
English Abstract for WO00/50518 on the front page of the International Publication.
BASF Corp., U.S. Appl. No. 09/890,520 filed on Jul. 31, 2001, entitled "Powder slurry Curable with actinic radiation and, if desired, thermally, its preparation and use" pp. 1–50.

(Continued)

Primary Examiner—Patrick D. Niland

(57) ABSTRACT

A pseudoplastic powder clearcoat slurry which is free from organic solvents and comprises solid and/or highly viscous, particles which are dimensionally stable under storage and application conditions and have an average size of from 0.8 to 20 μm, at least 99% of the particles having a size ≦30 μm, which is preparable by
1) emulsifying an organic solution comprising binder and crosslinking agent to give an emulsion of the oil-in-water type,
2) removing the organic solvent or solvents, and
3) wet grinding the resulting slurry;
and also the use of the powder clearcoat slurry to produce clearcoats for automotive OEM finishing and automotive refinish, for furniture coating and for industrial coating, including coil coating, container coating and the coating of electrical components.

15 Claims, No Drawings

OTHER PUBLICATIONS

BASF Corp., U.S. Appl. No. 09/856,951 filed on May 29, 2001, entitled Coating composition consisting Of at least three components, its preparation and use, pp. 1–89 and the abstract.

BASF Corp., U.S. Appl. No. 09/786,956 filed on Mar. 12, 2001, entitled Pseudoplastic powder clearcoat Slurry free from organic solvents and external emulsifers, process for preparing it, and its use, pp. 1–33 and the abstract.

English Abstract for DE19652842.

* cited by examiner

PSEUDOPLASTIC POWDERED LACQUER SLURRY FREE OF ORGANIC SOLVENTS METHOD FOR PRODUCTION AND THE USE THEREOF

This application is a National Phase Application of Patent Application PCT/E01/00260 filed on 11, Jan. 2001

The present invention relates to a novel powder clearcoat slurry, free from organic solvents, which possesses pseudoplasticity. The present invention also relates to a novel process for preparing this powder clearcoat slurry. The invention relates not least to the use of the novel powder clearcoat slurry for producing clearcoats for the automotive sector and for the industrial sector.

For the coating of automobile bodies, preference is given today to the use of liquid coating materials, i.e., spray paints. These give rise to numerous environmental problems owing to their solvent content. The same applies to cases where waterborne clearcoat materials are used, since they still always contain certain amounts of organic solvents.

Waterborne clearcoat materials of this kind are known from the German patent DE 196 23 371 A1. Directly after application, the conventional waterborne clearcoat materials do not dry to a powder but instead flow out to form a continuous film. They comprise aqueous secondary dispersions and are used in the automotive sector for aqueous multicoat systems or aqueous one-component or two-component clearcoats. The aim here is for sedimentation-stable dispersions having an average particle size of from about 10 to about 200 nm. The reason for this is the experience, familiar to the skilled worker, whereby, the better the stabilization and the smaller the size of dispersion particles, the less their tendency to settle. For reliable application characteristics and in order to reduce the popping tendency, however, it is necessary to use up to 20% by weight of solvents as well.

For this reason, increased efforts have been made in recent years to use powder coating materials for the coating. The results to date, however, have not been satisfactory; in particular, powder coating materials still show weaknesses with regard to chemical resistance and yellowing.

In the meantime, many developments have aimed to provide powder clearcoat materials in the form of aqueous dispersions that can be processed using liquid coating technologies. These dispersions are also referred to as powder clearcoat slurries. These customary and known powder clearcoat slurries, in contradistinction to the powder clearcoat materials, may be processed in conventional wet coating plants and may be applied at substantially lower coat thicknesses of about 40 $\mu$m, relative to about 80 $\mu$m in the case of powder coating materials, with good leveling and with a chemical resistance which is comparable with that of the powder coating materials.

For instance, the European patent EP 0 652 264 A1 or the German patent application DE 196 18 657 A1 discloses a powder clearcoat slurry in which the solid binder and crosslinker components and, if desired, additives are, as is usual for the production of powder coating materials, first of all coextruded and then subjected to dry grinding, after which, in a further step of wet grinding, they are converted into a powder clearcoat slurry with the aid of emulsifiers and wetting agents.

In order that in the course of wet grinding there is no clogging of the grinding equipment—the stirred ball mills, for example—the powder clearcoat slurries or the particles present therein are required in accordance with the aforementioned German patent application to have a glass transition temperature of from 20 to 90° C., preferably from 40 to 70° C. This boundary condition considerably restricts the scope for variation of the material composition of the known powder clearcoat slurries. And yet it is not possible to do without wet grinding, since otherwise the coarse particle fraction of the powder clearcoat slurry is not reduced in size.

The known clearcoat powder slurry must on the one hand, on performance grounds, contain comparatively coarse particles with an average size of from 2 to 6 $\mu$m. On the other hand, it has to be filtered prior to application. In the course of this filtering operation, even very small coarse particle fractions (particle size >10 $\mu$m) result in clogging of the filters, so that the production process has to be stopped—a disadvantage both technically and economically.

The German patent DE 196 17 086 A1 discloses a powder clearcoat slurry in which the average size of the solid particles is from 0.1 to 10 $\mu$m. It is preferred in this case to employ average particle sizes of from 0.23 to 0.43 $\mu$m. For stabilization, it is necessary, in addition to the ionic stabilization, to employ external emulsifiers as well—generally polyethylene oxide adducts, which decrease the resistance of the coating to water and moisture. Moreover, these known powder clearcoat slurries still always include certain amounts of organic cosolvents or leveling agents, which cannot be removed since they are essential to the leveling properties of the partly dried film. Moreover, special equipment such as pressure release homogenizing nozzles are necessary for their preparation. Prior to their application, they are adjusted to the application viscosity using thickeners. A complex viscosity behavior is not described. Furthermore, the patent does not give any teaching as to how the problem of filterability in connection with powder clearcoat slurries might be solved.

The German patent application DE 198 41 842.6, unpublished at the priority date of the present specification, describes a powder clearcoat slurry which is free from organic solvents and external emulsifiers and comprises solid spherical particles with an average size of from 0.8 to 20 $\mu$m and a maximum size of 30 $\mu$m, the powder clearcoat slurry having an ion-forming group content of from 0.05 to 1 meq/g, a neutralizing agent content of from 0.05 to 1 meq/g, and a viscosity of (i) from 50 to 1 000 mPas at a shear rate of 1 000 s$^{-1}$, (ii) from 150 to 8 000 mPas at a shear rate of 10 s$^{-1}$, and (iii) from 180 to 12 000 mPas at a shear rate of 1 s$^{-1}$.

This powder clearcoat slurry can be prepared with a smaller number of processing steps than the known powder clearcoat slurries; owing to its typical powder slurry properties, however, with residual solvent contents of <1%, and its comparable particle sizes, it has application characteristics similarly advantageous to the known slurries. In contrast to the known waterborne clearcoat materials, it has reliable application characteristics in terms of popping marks at the required film thicknesses of about 40–50 $\mu$m even without the aid of organic solvents. Moreover, it and the process for its preparation continue to exhibit the main advantage of the mixing of components in solution, namely the very good homogeneity of the resulting particles. It has been found that even this powder clearcoat slurry must be filtered prior to its application and in the course of such filtration gives rise to problems similar to those encountered with the known powder clearcoat slurries. Whether and, if so, under what boundary conditions the powder clearcoat slurry described in DE-A-198 41 842.6 can be subjected to wet grinding is not stated therein.

It is an object of the present invention to provide a novel powder clearcoat slurry which no longer has the disadvantages of the prior art. In particular, the novel powder clearcoat slurry should be preparable with a smaller number of processing steps than the conventional powder clearcoat slurries. However, on the basis of its typical powder slurry properties, with residual solvent contents of <1%, and its comparable particle sizes, it should have similarly advantageous application characteristics to said conventional powder clearcoat slurries. In contrast to the known waterborne clearcoat materials, the novel powder clearcoat slurries should ensure reliable application characteristics with regard to popping marks at the required film thicknesses of approximately 40–50 µm, even without the assistance of organic solvents. Moreover, they should be able to be subjected to wet grinding without any problems. In this context their material composition ought to be able to be varied with considerably greater width than that of the known powder clearcoat slurries, without any problems occurring during wet grinding. In other words, the novel powder clearcoat slurry ought to have a considerably wider processing window in terms of wet grinding than the known slurries. After wet grinding, the novel powder clearcoat slurry should be filterable without problems.

A further object of the present invention was to find a novel process for preparing powder clearcoat slurries which continues to ensure the essential advantage of the mixing of the components in solution: the very good homogeneity of the resulting particles.

The invention accordingly provides the novel, pseudoplastic powder clearcoat slurry which is free from organic solvents and comprises solid and/or highly viscous, particles which are dimensionally stable under storage and application conditions and have an average size of from 0.8 to 20 µm, at least 99% of the particles having a size ≦30 µm, which is preparable by
1) emulsifying an organic solution comprising binder and crosslinking agent to give an emulsion of the oil-in-water type,
2) removing the organic solvent or solvents, and
3) wet grinding the resulting slurry.

In the text below, the novel, pseudoplastic powder clearcoat slurry free from organic solvents is referred to for short as the "slurry of the invention".

Further subject matter of the invention will emerge from the description.

In the light of the prior art it was surprising and unforeseeable for the skilled worker that the object on which the present invention is based could be achieved by means of the slurry of the invention. A particular surprise was that the slurry of the invention could be wet-ground at temperatures which lay above the minimum film-forming temperature (MFFT) of its particles without any problems occurring. A further surprise was that the slurry of the invention was stable even without external emulsifiers.

For the slurry of the invention it is essential for the average size of the solid particles to be from 0.8 to 20 µm, and particularly preferably from 2 to 6 µm. The average particle size is understood as meaning the 50% median determined according to the laser diffraction method, i.e., 50% of the particles have a diameter≦the median and 50% of the particles have a diameter≧the median.

Slurries having average particle sizes of this kind and a solvent content of <1% exhibit better application characteristics and, at the applied film thicknesses of >30 µm as presently practiced in the automotive industry for the finishing of automobiles, exhibit much less of a tendency toward popping and "mudcracking" than conventional powder clearcoat slurries.

The upper limit of particle size is reached when the size of the particles means that they are no longer able to flow out fully on baking, and thus the film leveling is adversely affected. In cases where requirements regarding the appearance are not very stringent, however, the limit may also be higher. 30 µm is considered a sensible upper limit, since above this particle size the rinse ducts of the highly sensitive application apparatus are likely to become blocked.

The particles in the slurry of the invention are solid and/or highly viscous. In the context of the present invention, "highly viscous" means that the particles behave essentially like solid particles under the customary and known conditions of the storage and application of powder clearcoat slurries.

The particles in the slurry of the invention are also dimensionally stable. In the context of the present invention, "dimensionally stable" means that the particles, under the customary and known conditions of the storage and application of powder clearcoat slurries, neither agglomerate nor breakdown into smaller particles but instead essentially retain their original form even under the influence of shear forces.

The slurry of the invention is free from organic solvents. In the context of the present invention this means that it has a residual volatile solvent content of <1% by weight, preferably <0.5% by weight, and with particular preference <0.2% by weight. In accordance with the invention it is of very particular advantage if the residual content is below the gas-chromatographic detection limit.

The above-described particle sizes for use in accordance with the invention are obtained even without the aid of additional external emulsifiers if the binder has an ion-forming group content corresponding to an average acid number or amine number of from 3 to 56 g KOH/g solids (MEQ acid or MEQ amine of from 0.05 to 1.0 meq/g solids), preferably up to 28 (MEQ acid or MEQ amine: up to 0.5 meq/g solids), and in particular up to 17 (MEQ acid or MEQ amine: up to 0.3 meq/g solids).

In accordance with the invention, the general aim is for a low amount of such groups, since, when the customary crosslinking agents are used, such as blocked polyisocyanates, for example, free groups of this kind may remain in the film and may reduce the strength with regard to environmental substances and chemicals. On the other hand, the acid group content must still be sufficiently high to ensure the desired stabilization.

The ion-forming groups are neutralized 100%, or else only partially neutralized to <100%, with the aid of neutralizing agents. The amount of neutralizing agent is chosen such that the MEQ value of the slurry of the invention is below 1, preferably below 0.5, and in particular below 0.3 meq/g solids. In accordance with the invention it is of advantage if the amount of neutralizing agent corresponds at least to an MEQ value of 0.05 meq/g solids.

In general, therefore, the chemical nature of the binder is not restrictive provided it comprises ion-forming groups which are convertible by neutralization into salt groups and so are able to take on the function of ionically stabilizing the particles in water.

Suitable anion-forming groups are preferably acid groups such as carboxylic, sulfonic or phosphonic acid groups. Accordingly, the neutralizing agents used are bases, such as alkali metal hydroxides, ammonia, or amines. Alkali metal hydroxides are suitable for use only to a limited extent, since the alkali metal ions are nonvolatile on baking and, owing to their incompatibility with organic substances, may cloud the film and lead to instances of loss of gloss. Consequently, ammonia or amines are preferred. In the case of amines, preference is given to water-soluble tertiary amines. By way of example, mention may be made of N,N-dimethylethanolamine or aminomethylpropanolamine (AMP).

Suitable cation-forming groups are preferably primary, secondary or tertiary amines. Accordingly, neutralizing agents used are, in particular, low molecular mass organic acids such as formic acid, acetic acid or lactic acid.

Binders which contain cation-forming groups are known from the field of electrodeposition coating materials. By way of example, reference may be made to the patents EP-A-0 012 463, EP-A-0 612 818 or U.S. Pat. No. 4,071,428.

For the preferred use of the slurry of the invention as unpigmented clearcoat materials in automotive finishing, preference is given to polymers or oligomers containing acid groups as ion-forming groups, since these so-called anionic binders are generally more resistant to yellowing than the class of the cationic binders.

Nevertheless, cationic binders with groups convertible into cations, such as amino groups, are likewise suitable for use in principle provided the field of use is tolerant of their typical secondary properties, such as their tendency toward yellowing.

As binders which contain anion-forming groups, it is possible to use any desired resins containing the abovementioned acid groups. However, it is important that they also carry further groups which ensure crosslinkability. In accordance with the invention, hydroxyl groups are preferred.

Suitable oligomers and polymers of this kind for use in accordance with the invention include hydroxyl-containing, preferably linear and/or branched and/or block, comb and/or random poly(meth)acrylates, polyesters, alkyds, polyurethanes, acrylated polyurethanes, acrylated polyesters, polylactones, polycarbonates, polyethers, (meth) acrylatediols or polyureas.

Besides the hydroxyl groups, the oligomers and polymers may also include other functional groups such as acryloyl, ether, amide, imide, urethane, urea, thio, carbonate or epoxide groups, provided these do not disrupt the crosslinking reactions.

These oligomers and polymers are known to the skilled worker, and many suitable products are available on the market.

In accordance with the invention, the polyacrylates, the polyesters, the alkyd resins, the polyurethanes and/or the acrylated polyurethanes are of advantage and are therefore used with preference.

Examples of suitable polyacrylates are described in the European patent application EP-A-0 767 185 and the American patents U.S. Pat. Nos. 5,480,493, 5,475,073 or 5,534,598. Further examples of particularly preferred polyacrylates are sold under the brand name Joncryl$^R$, such as Joncryl$^R$ SCX 912 and 922.5, for instance. The preparation of these polyacrylates is widely known and is described, for example, in the standard work Houben-Weyl, Methoden der organischen Chemie, 4th edition, volume 14/1, pages 24 to 255, 1961.

The preparation of the polyesters and alkyd resins which are used with preference in accordance with the invention is widely known and is described, for example, in the standard work Ullmanns Encyklopadie der technischen Chemie, 3rd edition, volume 14, Urban & Schwarzenberg, Munich, Berlin, 1963, pages 80 to 89 and pages 99 to 105, and also in the following books: "Résines Alkydes-Polyesters" by J. Bourry, Paris, Dunod, 1952, "Alkyd Resins" by C. R. Martens, Reinhold Publishing Corporation, New York, 1961, and "Alkyd Resin Technology" by T. C. Patton, Interscience Publishers, 1962.

The polyurethanes and/or acrylated poly-urethanes whose use is particularly preferred in accordance with the invention are described, for example, in the patents EP-A-0 708 788, DE-A-44 01 544 or DE-A-195 34 361.

Suit,able crosslinkers include all crosslinking agents which are customary in the field of light-stable clearcoat materials. Examples thereof are etherified melamine-formaldehyde resins, benzoguanamine resins, resins or compounds containing siloxane groups, resins or compounds containing anhydride groups, resins or compounds containing epoxide groups, blocked and/or unblocked polyisocyanates, and/or tris(alkoxycarbonylamino)triazines, as described in the patents U.S. Pat. Nos. 4,939,213, 5,084, 541, 5,288,865 or EP-A-0 604 922. In accordance with the invention, the blocked polyisocyanates are of advantage and are therefore used with particular preference. Examples of suitable blocked polyisocyanates are described in the German patents DE-A-196 17 086 and 196 31 269 and also in the European patents EP-A-0 004 571 and 0 582 051.

The slurry of the invention comprises preferably nonionic and ionic thickeners. This effectively counters the tendency of the comparatively large solid particles toward sedimentation, and at the same time pseudoplasticity is brought about.

Examples of nonionic thickeners are hydroxyethylcellulose and polyvinyl alcohols. Nonionic associative thickeners are likewise available on the market in diverse selection. They consist for example of water-dilutable polyurethanes, which are the reaction products of water-soluble polyetherdiols, aliphatic diisocyanates and monofunctional hydroxy compounds containing an organophilic radical.

Likewise commercially available are ionic thickeners. These usually contain anionic groups and are based for example on special polyacrylate resins containing acid groups, some or all of which may have been neutralized.

Examples of suitable thickeners for use in accordance with the invention are known from the text-book "Lackadditive" [Additives for coatings] by Johan Bieleman, Wiley-VCH, Weinheim, N.Y., 1998, pages 31 to 65.

For the slurry of the invention it is especially advantageous if both of the above-described types of thickener are present therein. The amount of thickeners to be added and the ratio of ionic to nonionic thickener is guided by the desired viscosity of the slurry of the invention, which in turn is determined by the required sedimentation stability and by the special requirements of spray application. The skilled worker will therefore be able to determine the amount of the thickeners and the ratio of the thickener types to one another on the basis of simple considerations, possibly with the aid of preliminary tests.

Preferably, a viscosity range of from 50 to 1 500 mPas at a shear rate of 1 000 s$^{-1}$ and from 150 to 8 000 mPas at a shear rate of 10 s$^{-1}$ is set.

This viscosity behavior, known as "pseudoplasticity", describes a state which does justice both to the requirements of spray application, on the one hand, and to the requirements in terms of storage and sedimentation stability, on the other: in the state of motion, such as when pumping the slurry of the invention in circulation in the ring circuit of the coating installation and when spraying, for example, the slurry of the invention adopts a state of low viscosity which ensures easy processability. Without shear stress, on the other hand, the viscosity rises and thus ensures that the coating material already present on the substrate to be coated has a reduced tendency to form runs on vertical surfaces. In the same way, a result of the higher viscosity in the stationary state, such as during storage, for instance, is that sedimentation of the solid particles is largely prevented or that any slight degree of settling of the powder slurry of the invention during the storage period can be removed again by agitation.

In addition to the essential constituents described above, the solid particles of the slurry of the invention may comprise additives such as are commonly used in clearcoat materials. In this context it is essential that these additives do not substantially lower the minimum film-forming temperature (MFFT) or the glass transition temperature Tg of the binders.

Examples of suitable additives are polymers, crosslinking catalysts, defoamers, adhesion promoters, additives for improving substrate wetting, additives for improving surface smoothness, flatting agents, light stabilizers, corrosion inhibitors, biocides, flame retardants, and polymerization inhibitors, especially photoinhibitors, as described in the book "Lackadditive" by Johan Bielemann, Wiley-VCH, Weinheim, N.Y., 1998.

Crosslinking components of polyol type, reactive diluents or leveling assistants which may be incorporated by crosslinking in the film may be added to the slurry of the invention. It is important, however, that these components are located preferably in the external, aqueous phase of the slurry of the invention and not in the disperse organic phase, where they would bring about a lowering of the MFFT of the particles contained herein and thus coalescence or coagulation of any sedimented particles.

Examples of suitable compounds of this kind are oligomeric polyols, which are obtainable by hydroformylation and subsequent hydrogenation from oligomeric intermediates themselves obtained by metathesis reactions of acyclic monoolefins and cyclic monoolefins; examples of suitable cyclic monoolefins are cyclobutene, cyclopentene, cyclohexene, cyclooctene, cycloheptene, norbornene or 7-oxanorbornene; examples of suitable acyclic monoolefins are present in hydrocarbon mixtures which are obtained in petroleum processing by cracking ($C_5$ cut); examples of suitable oligomeric polyols for use in accordance with the invention have a hydroxyl number (OHN) of from 200 to 450, a number-average molecular weight Mn of from 400 to 1 000D, and a mass-average molecular weight $M_w$ of from 600 to 1 100; further examples of suitable compounds of this kind are branched, cyclic and/or acyclic $C_9$–$C_{16}$ alkanes functionalized with at least two hydroxyl groups, especially positionally isomeric diethyloctanediols, and also cyclohexanedimethanol, neopentyl glycol hydroxypivalate, neopentyl glycol, trimethylolpropane or pentaerythritol.

It is of advantage in accordance with the invention to prepare the slurry of the invention by means of the process of the invention.

In the process of the invention, the ionically stabilizable binders and the crosslinking agents and also, if appropriate, the additives are mixed in organic solution and dispersed together in water with the aid of neutralizing agents by the secondary dispersion process. The system is then, diluted with water, while stirring. A water-in-oil emulsion is formed first of all, which on further dilution changes to become an oil-in-water emulsion. This point is generally reached at solids contents of <50% by weight, based on the emulsion, and is evident externally from a relatively sharp drop in viscosity in the course of dilution.

The emulsion thus obtained, which still contains solvent, is subsequently freed from solvents (stripping) by means of azeotropic distillation.

In accordance with the invention it is of advantage if the minimum film-forming temperature of the binders is at least 0° C., preferably at least 10° C., with particular preference at least 15° C., with very particular preference at least 20° C., and in particular at least 25° C. The minimum film-forming temperature may be determined by drawing down the dispersion onto a glass plate using a bar coater and heating it in a gradient oven. The temperature at which the pulverulent layer films is designated the minimum film-forming temperature. For further details, refer to Römpp Lexikon Lacke und Druckfarben, Georg Theime Verlag, Stuttgart, N.Y., 1998 "minimum film-forming temperature", page 391.

It is of advantage in accordance with the invention if the solvents to be removed are distilled off at a distillation temperature below 70° C., preferably below 50° C. and in particular below 40° C. If appropriate, the distillation pressure is chosen so that in the case of higher-boiling solvents this temperature range is still maintained.

At its simplest, the azeotropic distillation may be realized by stirring the emulsion at room temperature in an open vessel for several days. In the preferred case, the solvent-containing emulsion is freed from the solvents by a vacuum distillation.

In order to avoid high viscosities, the amount of water and solvents removed by distillation or evaporation is preferably replaced by water. The water may be added before, during and/or after, preferably before, the evaporation or distillation, in portions.

After the solvents have been lost, the MFFT of the dispersed particles rises, and instead of the previous solvent-containing emulsion (liquid-in-liquid dispersion) a solid-in-liquid dispersion is formed. In the context of the present invention, the concept of a solid-in-liquid dispersion also embraces a dispersion of highly viscous particles in water.

In accordance with the invention, the particles of the resulting slurry are mechanically comminuted in the wet state, this being referred to in the context of the present invention as wet grinding of the slurry. In this grinding process, conditions are employed such that the temperature of the ground material does not exceed 70° C., preferably 60° C., and in particular 50° C. The specific energy input during the grinding process is preferably 10 to 1000, more preferably from 15 to 750, and in particular from 20 to 500 Wh/g.

Wet grinding can be carried out using any of a wide variety of apparatus which produces high or low shear fields.

Examples of suitable apparatus which produces low shear fields includes customary and known stirred tanks, slot homogenizers, microfluidizers or dissolvers.

Examples of suitable apparatus which produces high shear fields include customary and known stirred mills or inline dissolvers In accordance with the invention it is particularly preferred to employ the apparatus which produces high shear fields. Among such apparatus, the stirred mills are particularly advantageous in accordance with the invention and are therefore used with very particular preference.

In general, in the course of wet grinding, the slurry is supplied to the apparatus described above by means of suitable equipment such as pumps, and is circulated through said apparatus until the desired particle size has been reached and the slurry of the invention is obtained.

In accordance with the invention it is of advantage in particular for energy reasons if the slurry to be ground contains only some—preferably from 5 to 90% by weight, more preferably from 10 to 80% by weight, and in particular from 20 to 70% by weight—of the above-described thickeners present in the slurry of the invention. Where this variant of the process of the invention is employed, the remaining amount of thickener is to be added after wet grinding, so giving the slurry of the invention.

The slurry of the invention advantageously has a solids content of from 10 to 60% by weight, in particular from 20 to 50% by weight.

Preferably, the slurry of the invention is filtered before being used. For this purpose use is made of the customary and known filtration apparatus and filters, such as are also suitable for the filtration of the known powder clearcoat slurries. The mesh size of the filters may vary widely and is guided primarily by the particle size and size distribution of the particles of the slurry of the invention. The skilled worker is therefore able to determine the appropriate filters with ease on the basis of this physical parameter. Examples of suitable filters include bag filters. These bag filters are available in the market under the brand name Pong® or Cuno®. It is preferred to use bag filters having mesh sizes of from 10 to 50 µm, examples being Pong® 10 to Pong® 50.

In the course of filtration the further particular advantage of the slurry of the invention becomes evident, namely that it can be filtered without problems even when in the course of wet grinding the minimum film-forming temperature of the particles present therein was exceeded.

To produce the clearcoats of the invention, the slurry of the invention is applied to the substrate that is to be coated. No special measures need be taken here; instead, the application may take place in accordance with the customary and known techniques, which is another particular advantage of the slurry of the invention.

Following its application, the slurry of the invention dries without problems and does not film at the processing temperature, generally at room temperature. In other words, the slurry of the invention applied as a wet film loses water when flashed off at room temperature or slightly elevated temperatures, without the particles present therein altering their original solid form. The solid film in powder form loses the residual water by evaporation more easily than a flowing wet film. As a result, the risk of bubbles of evaporated water enclosed in the cured film (popping) is reduced. Moreover, the tendency toward mudcracking is extremely low.

In the subsequent baking step, the now substantially water-free powder layer is melted and caused to crosslink. In some cases, it may be of advantage to carry out the leveling process and the crosslinking reaction with a chronological offset, by operating in accordance with a staged heating program or a so-called heating ramp. The appropriate crosslinking temperature for the present examples is between 120 and 160° C. The corresponding baking time is between 20 and 60 minutes.

The clearcoat which results in this case has outstanding performance properties. For instance, it adheres firmly to all customary and known basecoats or to substrates such as metal, glass, wood or plastic. It is of high gloss, smooth, scratch-resistant, stable to weathering and free from defects. On the basis of its advantageous profile of properties, moreover, the slurry of the invention is also suitable for applications other than automotive finishing, especially for the coating of furniture and for industrial coating, including coil coating and container coating, and the coating of electrical components.

EXAMPLE

Preparation Example 1

The Preparation of a Solution Polyacrylate Resin 445.3 parts by weight of methyl ethyl ketone (MEK) were introduced into a reaction vessel and heated to 80° C. The initiator solution, consisting of 47.6 parts by weight of TBPEH (tert-butyl perethylhexanoate) and 31.1 parts by weight of MEK, and the monomer mixture, consisting of 183.3 parts by weight of tert-butyl acrylate, 71.4 parts by weight of n-butyl methacrylate, 95.2 parts by weight of cyclohexyl methacrylate, 121.4 parts by weight of hydroxyethyl methacrylate and 4.76 parts by weight of acrylic acid, were metered into this initial charge at 80° C. with stirring over the course of 5 h from two separate feed vessels. The reaction mixture was then heated to 80° C. for two hours, and a fraction of the volatile components of the reaction mixture was stripped off under reduced pressure at 500 mbar for 5 h. The resin solution was then cooled to 50° C. and discharged.

The resin solution had the following characteristics:
Solids: 71.4% by weight (1 h at 130° C.)
Viscosity: 8.0 dPas (cone and plate viscometer at 23° C.; 55% strength solution)
Acid number: 10.1 mg KOH/g resin solids Preparation Example 2

The Preparation of a Blocked Polyisocyanate Crosslinker 837 parts of isophorone diisocyanate were introduced into an appropriate reaction vessel, and 0.1 part of dibutyltin dilaurate was added. A solution of 168 parts of trimethylolpropane and 431 parts of methyl ethyl ketone was then run in slowly. As a result of the exothermic reaction, the temperature rose. After it had reached 80° C., the temperature was kept constant by external cooling and the rate of addition of the feed stream was reduced slightly if necessary. After the end of the feed stream, the mixture was held at this temperature for about 1 hour until the isocyanate content of the solids had reached 15.7% by weight based on the solids. The reaction mixture was subsequently cooled to 40° C. and a solution of 362 parts of 3,5-dimethylpyrazole in 155 parts of methyl ethyl ketone was added over the course of 30 minutes. After the reaction mixture had heated up to 80° C., owing to the exothermic reaction, the temperature was kept constant for 30 minutes until the NCO content had dropped to less than 0.1% by weight. Then 47 parts of n-butanol were added to the reaction mixture, which was held at 80° C. for a further 30 minutes and then, after brief cooling, was discharged.

The reaction product had a solids content of 70% by weight (1 h at 130° C.).

Example 1

The Preparation of an Inventive Powder Clearcoat Slurry 975.1 parts by weight of the acrylate resin solution from preparation example 1 and 567.7 parts by weight of the crosslinker solution from preparation example 2 were mixed at room temperature in an open vessel for 15 minutes with stirring. Then 10.9 parts by weight of Cyagard® 1164 L (UV absorber from Cytec), 10.9 parts by weight of Tinuvin® liquid 123 (sterically hindered amine "HALS" from Ciba Geigy) and 9.5 parts by weight of N,N-dimethylethanolamine were added and the resulting mixture was stirred at room temperature for a further two hours. The mixture was then diluted with 645.9 parts by weight of deionized water in small portions. After an interval of 15 minutes, a further 780.0 parts by weight of water were added. This gave an aqueous emulsion of low viscosity with a theoretical solids content of 37% by weight, which was stirred at room temperature for a further 48 hours. The amount of liquid evaporated off was supplemented by adding deionized water until the original level was regained. This gave a powder clearcoat slurry having the following characteristics:

| Solids (2 h, 80° C.): | 36.7% by weight |
|---|---|
| Solvent content: | <0.05% (by gas chromatography) |

In order to produce the desired pseudo-plasticity, 22.6 parts by weight of Acrysol® RM 8 (nonionic associative thickener from Rohm & Haas) and 6.0 parts of Viskalex® HV 30 (anionic thickener based on polyacrylate resin, from Allied Colloids) were incorporated by stirring into 1000 parts by weight of this powder clearcoat slurry. The viscosity profile of the resultant inventive powder clearcoat slurry 1 was as follws:

820 mPas at a shear rate of 100 s$^{-1}$
210 mPas at a shear rate of 1 000 s$^{-1}$ The resultant powder clearcoat slurry had a minimum film-forming temperature of 45° C. It was ground by means of a stirred ball mill. For this purpose the powder clearcoat slurry, using a pump, was supplied to the mill and circulated through the mill until the desired quality [particle sizes: $x_{50}$ 2.5 μm; $X_{max}$<10 μm (oversize: laser diffraction measuring instrument from Malvern)] had been reached.

The wet-ground powder clearcoat slurry, i.e., the slurry of the invention, was filtered without problems using bag filters (Pong® 50) without any clogging of the filters.

After storage at room temperature for 4 weeks, there was a very slight sediment, which had only settled loosely, and which could be reagitated again to homogeneity within 5 minutes using a simple laboratory stirrer.

Example 2
The Use of the Inventive Powder Clearcoat Slurry as Part of a Multicoat Color or Effect Paint System to Produce a Clearcoat The inventive powder clearcoat slurry of example 1 was applied with preparation of a so-called integrated system, which is described below for a gray metallic shade.

Using a gravity feed gun, a functional coat (Ecoprime® from BASF Coatings AG) was applied to steel panels coated cathodically with a commercial electrocoat material. After flashing off at room temperature for 5 minutes, a gray aqueous metallic basecoat (Ecostar® from BASF Coatings AG) was applied in the same way to this coat and was subsequently predried at 80° C. for 5 minutes.

After the panels had been cooled, the inventive powder clearcoat slurry was applied in the same way. Thereafter, the panels were first flashed off for 5 minutes and then predried at 40° C. for 15 minutes. They were subsequently baked at 145° C. for 30 minutes.

This gave an aqueous metallic overall paint system in a gray shade. The applied wet films had been chosen so that, after baking, the dry film thicknesses for the functional coat and for the aqueous metallic basecoat were each 15 μm. The inventive clearcoat had a film thickness of from 40 to 45 μm. The inventive multicoat paint system had an outstanding overall appearance. At the applied clearcoat thickness, no defects in the form of popping marks and mudcracking are evident in the clearcoat.

The table below gives an overview of the tests conducted and the results obtained in them.

TABLE

The performance properties of the inventive clearcoat

| Properties | Example 2 |
|---|---|
| Clearcoat thickness | 40–45 μm |
| Gloss at 20°*) | 77 |
| Haze*) | 80 |
| Appearance | bright |
| Leveling | very good |
| Popping marks | none |
| Mudcracking | none |

What is claimed is:

1. A pseudoplastic powder clearcoat slurry which is free from organic solvents and comprises solid and/or highly viscous particles which are dimensionally stable under storage and application conditions and have an average size of from 0.8 to 20 μm, at least 99% of the particles having a size ≦30 μm, which is obtained by a process comprising 1) emulsifying an organic solution comprising at least one binder, at least one crosslinking agent, and one or more organic solvents to give an emulsion, 2) removing the one or more organic solvents to provide a slurry, and 3) wet grinding the slurry wherein the particles comprise polyols as binders and blocked polyisocyanates and/or tris(alkoxycarbonylamino)triazines as crosslinking agents.

2. The slurry of claim 1, wherein 4) the wet-ground slurry is filtered.

3. The slurry of claim 1, or 2, wherein 5) the removed solvent is replaced in whole or in part by water.

4. The slurry of claim 1, having an ion-forming group content of from 0.05 to 1 meq/g and a neutralizing agent content of from 0.05 to 1 meq/g.

5. The slurry of claim 1, having a viscosity of (i) from 50 to 1000 mPas at a shear rate of 1000 s$^{-1}$ and (ii) from 150 to 8000mPas at a shear rate of 100 s$^{-1}$.

6. The slurry of claim 1, having a solids content of from 10 to 60% by weight.

7. The slurry of claim 1, wherein the average size of the particles is from 2 to 6 μm.

8. The slurry of claim 1, further comprising ionic thickeners and nonionic associative thickeners.

9. The slurry of claim 1, wherein the particles comprise polyacrylates as binders and blocked polyisocyanates as crosslinking agents.

10. The slurry of claim 1, wherein the particles have a minimum film-forming temperature of at least 0° C.

11. The slurry of claim 1, wherein the organic solvents are removed at temperatures below the minimum film-forming temperature of the particles.

12. The slurry of claim 1, which is free from external emulsifiers.

13. The slurry of claim 6, having a solids content of from 20 to 50% by weight.

14. The slurry of claim 10, wherein the particles have a minimum film-forming temperature of at least 10° C.

15. A process of coating an article, comprising applying the slurry of claim 1 to at least one surface of an article.

* * * * *